(12) United States Patent
Emori

(10) Patent No.: US 11,009,187 B2
(45) Date of Patent: May 18, 2021

(54) HIGH-PRESSURE GAS TANK AND MOVABLE BODY

(71) Applicant: TOYOTA JIDOSHA KABUSHIKI KAISHA, Toyota (JP)

(72) Inventor: Sakuma Emori, Seto (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 427 days.

(21) Appl. No.: 15/801,810

(22) Filed: Nov. 2, 2017

(65) Prior Publication Data

US 2018/0135807 A1 May 17, 2018

(30) Foreign Application Priority Data

Nov. 16, 2016 (JP) .............................. JP2016-222883

(51) Int. Cl.
*F17C 13/04* (2006.01)
*B60K 15/03* (2006.01)
(Continued)

(52) U.S. Cl.
CPC ........ *F17C 13/04* (2013.01); *B60K 15/03006* (2013.01); *B60L 50/71* (2019.02); *F17C 1/00* (2013.01); *B60K 2015/03026* (2013.01); *B60K 2015/03046* (2013.01); *B60K 2015/03256* (2013.01); *B60K 2015/03315* (2013.01); *B60K 2015/0634* (2013.01); *B60Y 2400/202* (2013.01); *F17C 2201/0109* (2013.01); *F17C 2201/035* (2013.01); *F17C 2201/056* (2013.01); *F17C 2203/011* (2013.01);
(Continued)

(58) Field of Classification Search
CPC ............. F17C 13/04; F17C 1/00; F17C 1/005

USPC .......................................................... 220/562
See application file for complete search history.

(56) References Cited

U.S. PATENT DOCUMENTS

| | | | | |
|---|---|---|---|---|
| 2010/0276024 A1* | 11/2010 | Iida | .................... | H01M 8/04089 137/899 |
| 2011/0180551 A1* | 7/2011 | Handa | .............. | B60K 15/03006 220/592.2 |
| 2011/0233218 A1* | 9/2011 | Uchimura | ................. | F17C 1/06 220/581 |
| 2013/0154253 A1* | 6/2013 | Yuhara | .................... | F16L 15/04 285/36 |

FOREIGN PATENT DOCUMENTS

| CN | 102216666 A | 10/2011 |
|---|---|---|
| CN | 103069203 A | 4/2013 |

(Continued)

*Primary Examiner* — Steven A. Reynolds
*Assistant Examiner* — Javier A Pagan
(74) *Attorney, Agent, or Firm* — Finnegan, Henderson, Farabow, Garrett & Dunner, LLP

(57) ABSTRACT

A high-pressure gas tank includes: a tank body section; a base attached to an opening of the tank body section; a valve attached to an opening of the base so as to open and close a gas supply-discharge port of the tank body section, a part of the valve being inserted in the base, and the valve having a contact surface that contacts a seat surface as a surface of an end of the base, the surface of the end of the base forming the opening of the base; and a seal member arranged between an outer peripheral surface of a portion of the valve that is inserted in the opening of the base and an inner peripheral surface of the base. A slit for forming a communication hole communicating between outside of the high-pressure gas tank and a space between the base and valve is provided.

7 Claims, 6 Drawing Sheets

(51) Int. Cl.
*F17C 1/00* (2006.01)
*B60L 50/71* (2019.01)
*B60K 15/063* (2006.01)

(52) U.S. Cl.
CPC ............... *F17C 2203/0604* (2013.01); *F17C 2203/066* (2013.01); *F17C 2203/0619* (2013.01); *F17C 2203/0663* (2013.01); *F17C 2205/0305* (2013.01); *F17C 2205/0323* (2013.01); *F17C 2205/0391* (2013.01); *F17C 2209/2118* (2013.01); *F17C 2209/2154* (2013.01); *F17C 2221/012* (2013.01); *F17C 2223/0123* (2013.01); *F17C 2223/036* (2013.01); *F17C 2270/0178* (2013.01); *F17C 2270/0184* (2013.01); *Y02E 60/32* (2013.01); *Y02T 90/16* (2013.01); *Y02T 90/40* (2013.01)

(56) References Cited

FOREIGN PATENT DOCUMENTS

| | | | | |
|---|---|---|---|---|
| JP | 11-210988 A | 8/1999 | | |
| JP | 2009-162255 A | 7/2009 | | |
| JP | 2009-210026 A | 9/2009 | | |
| JP | 2009-243660 A | 10/2009 | | |
| JP | 2011-149545 A | 8/2011 | | |
| JP | 2012-031960 A | 2/2012 | | |
| JP | 2012031960 A | * 2/2012 | .......... | F16L 19/0218 |
| JP | 2014-228105 A | 12/2014 | | |
| JP | 2015-209857 A | 11/2015 | | |
| WO | WO2010/058452 A1 | 5/2010 | | |
| WO | WO-2010058452 A1 | * 5/2010 | ................ | F17C 1/06 |

* cited by examiner

IN-TANK PRESSURE

HIGH-PRESSURE GAS TANK AND MOVABLE BODY

INCORPORATION BY REFERENCE

The disclosure of Japanese Patent Application No. 2016-222883 filed on Nov. 16, 2016 including the specification, drawings and abstract is incorporated herein by reference in its entirety.

BACKGROUND

1. Technical Field

The disclosure relates to a high-pressure gas tank and a movable body on which the high-pressure gas tank is mounted.

2. Description of Related Art

As a tank that stores and seals high-pressure gas therein, a tank that includes: a tank body section that forms a space for storing the gas; a base that is attached to an opening of the tank body section; and a valve that is attached to the base has been known. In such a tank, in order to secure a gas sealing property, a sufficient sealing property is desirably secured in a connection section between the base and the valve. As a structure of securing the sealing property of the connection section between the base and the valve, a configuration of arranging an O-ring between an outer peripheral surface in a portion of the valve and an inner peripheral surface of the base has been known, the portion being inserted in the opening of the base, and the inner peripheral surface of the base contacting the outer peripheral surface of this valve (for example, see Japanese Patent Application Publication No. 2009-243660 (JP 2009-243660 A)).

SUMMARY

However, even when the O-ring is used as described above, a slight amount of the gas possibly permeates the O-ring and is possibly leaked from an inner side to an outer side of the tank body section, which stores the high-pressure gas. Thus, when the gas in the tank body section is leaked via the O-ring, in the base, the gas is accumulated in a minute space that is formed on the opening side of the base from the O-ring, and a pressure in the above minute space is increased. In such a state, when the gas in the tank is consumed and a pressure in the tank body section is abruptly decreased, for example, a magnitude relationship between the pressures in the base is possibly reversed with the O-ring being interposed therebetween. That is, the pressure in the above minute space possibly becomes higher than the pressure in the tank body section. When the magnitude relationship between the pressures is reversed with the O-ring being interposed therebetween, the sealing property by the O-ring is possibly degraded. More specifically, when a pressure in a reverse direction from a pressurizing direction in design is applied to the O-ring, projection (deformation) or the like of the O-ring possibly occurs, which results in possible sealing failure. For this reason, in the gas tank that secures the sealing property between the base and the valve by using the O-ring, a technique of further improving reliability of the sealing property has been desired. In addition, for a high-pressure gas tank of the related art, improvement in manufacturing efficiency, facilitation of manufacturing, cost cut, and the like of the high-pressure gas tank have been desired.

The disclosure can be realized as the following aspects.

According to one aspect of the disclosure, a high-pressure gas tank is provided. This high-pressure gas tank includes: a tank body section formed with a space for storing gas therein; a base attached to an opening of the tank body section; a valve attached to an opening of the base so as to open and close a gas supply-discharge port to the tank body section, a part of said valve being inserted in the base from the opening of the base, and the valve having a contact surface that contacts a seat surface as a surface of an end of the base, the surface of the end of the base forming the opening of the base; and a seal member arranged between an outer peripheral surface of a portion of the valve that is inserted in the opening of the base and an inner peripheral surface of the base. A slit for forming a communication hole communicating between outside of the high-pressure gas tank and a space between the base and valve is provided on at least one of the seat surface of the base and the contact surface of valve. According to the high-pressure gas tank of this aspect, the gas that is leaked from the tank body section side into the space between the base and the valve via the seal member on the inside of the base can be discharged to the outside of the high-pressure gas tank via the slit. Accordingly, an increase in a pressure in the above space between the base and the valve can be suppressed, and the pressure in the above space is suppressed from becoming higher than a pressure in the tank body section. Thus, degradation of a sealing property of the seal member, which is caused by such reversal of the pressures, can be suppressed.

In the high-pressure gas tank of the above aspect, the valve may be arranged in a manner to cover the seat surface of the base and extend from an outer periphery of the seat surface. With such a configuration, entry of a foreign substance into the base from the outside of the high-pressure gas tank through an opening of the communication hole formed by the slit can be suppressed.

In the high-pressure gas tank of the above aspect, a diameter of a portion of the valve other than a columnar portion that is inserted in a cylindrical section of the base may be larger than a diameter of the outer periphery of the seat surface of the base.

In the high-pressure gas tank of the above aspect, the base may have a positioning mark, which can be visually recognized from the outside of the high-pressure gas tank, on an outer peripheral surface of said base. When a first straight line that extends from the positioning mark toward an axis of the high-pressure gas tank in a perpendicular direction to the axis and a second straight line that extends from an opening of the communication hole formed on the outer peripheral surface side of the base toward the axis in the perpendicular direction to the axis are seen in an extending direction of the axis, an acute angle defined by the first straight line and the second straight line may be 30° or less. With such a configuration, when the high-pressure gas tank is arranged such that the positioning mark is positioned at a highest point in a vertical direction, the opening of the communication hole formed by the slit can be arranged near the lowest point in the vertical direction on an outer surface of the high-pressure gas tank. Thus, a distance can be secured from the opening of the communication hole formed by the slit to a space above an installation position of the high-pressure gas tank. As a result, an influence of the gas leaked from the slit on the above space can be suppressed.

In the high-pressure gas tank of the above aspect, the slit may be provided on the seat surface of the base.

In the high-pressure gas tank of the above aspect, the valve may be formed with a male screw on an outer peripheral surface of the columnar portion that is inserted in the cylindrical section of the base, and the base may be formed with a female screw on an inner peripheral surface of the cylindrical section. Between the valve and the base, the seal member may be arranged at a position on an inner side of the high-pressure gas tank from a position at which the male screw and the female screw are tightened. Between the valve and the base, a backup ring may be arranged at a position that is next to the seal member and that is on an outer side of the high-pressure gas tank from the seal member.

The disclosure can also be realized in various aspects other than the device. For example, the disclosure can be realized in aspects that include a manufacturing method of the high-pressure gas tank, an arrangement method of the high-pressure gas tank, a movable body on which the high-pressure gas tank is mounted, and the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
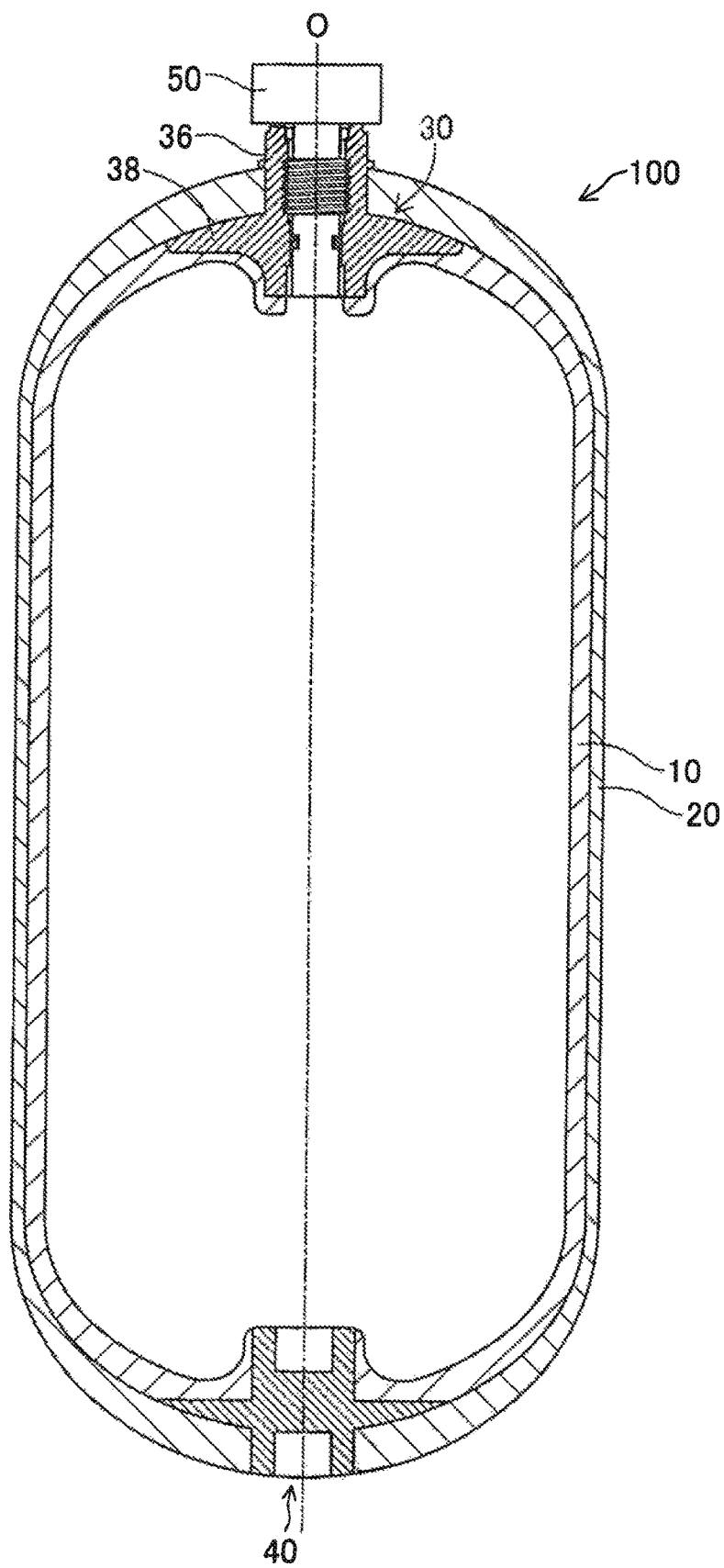
FIG. 1 is a cross-sectional view of a schematic configuration of a high-pressure gas tank.

A. Overall Configuration of High-pressure Gas Tank: FIG. 1 is a cross-sectional view of a schematic configuration of a high-pressure gas tank 100 as an embodiment of the disclosure. In this embodiment, the high-pressure gas tank 100 stores compressed hydrogen and is mounted on a fuel cell vehicle. The high-pressure gas tank 100 includes a liner 10, a reinforcing layer 20, a base 30, a base 40, and a valve 50. The liner 10 functions as the "tank body section". The liner 10, the reinforcing layer 20, and the base 40 are each formed to be substantially rotation-symmetrical about an axis O.

Together with the base 30, the liner 10 forms a space for sealing compressed hydrogen. The liner 10 can be formed of a synthetic resin such as a nylon-based resin (a polyamide-based resin) or a polyethylene-based resin, and is formed of nylon in this embodiment. In addition, the liner 10 has a shape that extends in an axis O direction and includes a portion, a diameter of which is decreased toward an end, on both sides of a portion that is formed cylindrically. An opening is provided in each of the above portions, the diameters of which are decreased, the base 30 is attached to one of the openings, and the base 40 is attached to the other. The liner 10 and the bases 30, 40 may integrally be formed by performing injection molding of the liner 10 with the bases 30, 40 as inserts, for example. Alternatively, the liner 10 and the bases 30, 40 may be integrated by press-inserting the bases 30, 40 in the liner 10 after molding.

Each of the bases 30, 40 is a member formed of metal (aluminum in this embodiment). A pipe that is related to supply of hydrogen to the high-pressure gas tank 100 and discharge of hydrogen from the high-pressure gas tank 100 is connected to the one base 30. Meanwhile, the other base 40 seals the space on the inside of the liner 10 (hereinafter simply referred to as the inside of the high-pressure gas tank 100) and functions as a heat transfer section that guides heat on the inside of the tank to the outside. The base 30 includes: a cylindrical section 36 in a substantially cylindrical shape in which a part of the valve 50 is inserted in the axis-O direction; and a flange section 38 in a flange shape that is substantially orthogonal to the cylindrical section 36. A detailed configuration of the base 30 will be described below.

The reinforcing layer 20 is formed to cover an outer surface of the liner 10 and reinforces the liner 10 to improve strength of the high-pressure gas tank 100. In detail, the reinforcing layer 20 is formed to cover the entire outer surface of the liner 10, an entire outer surface of the flange section 38 of the base 30, a part of an outer surface of the cylindrical section 36 of the base 30, and an outer surface of the base 40. The reinforcing layer 20 is made of fiber-reinforced plastic (for example, carbon fiber reinforced plastics (CFRP)) and is formed by a filament winding method (an FW method). More specifically, the reinforcing layer 20 is formed by using the liner 10 as a mandrel, winding fiber (for example, carbon fiber) that is impregnated with a thermosetting resin (for example, an epoxy resin) around the liner 10 for the specified number of turns, and then hardening the thermosetting resin.

The valve 50 is a member formed of metal (aluminum in this embodiment), is attached to an opening of the base 30, and opens/closes the opening of the base 30. More specifically, the valve 50 is a member that connects the high-pressure gas tank 100 and each of a channel for supplying hydrogen to the high-pressure gas tank 100 and a channel for guiding discharged hydrogen from the high-pressure gas tank 100. The valve 50 includes: an in-valve channel that communicates between each of these channels and the inside of the high-pressure gas tank 100; and various valves, each of which adjusts a communication state in the in-valve channel. That is, the valve 50 is a member that opens/closes a gas supply-discharge port to the liner 10 (the tank body section). As it has already been described, the part of the valve 50 is inserted in the cylindrical section 36 of the base 30, and one end of the in-valve channel is opened on the inside of the high-pressure gas tank 100. A detailed description on a connection section between the valve 50 and the base 30 will be made below.

Figure 2:
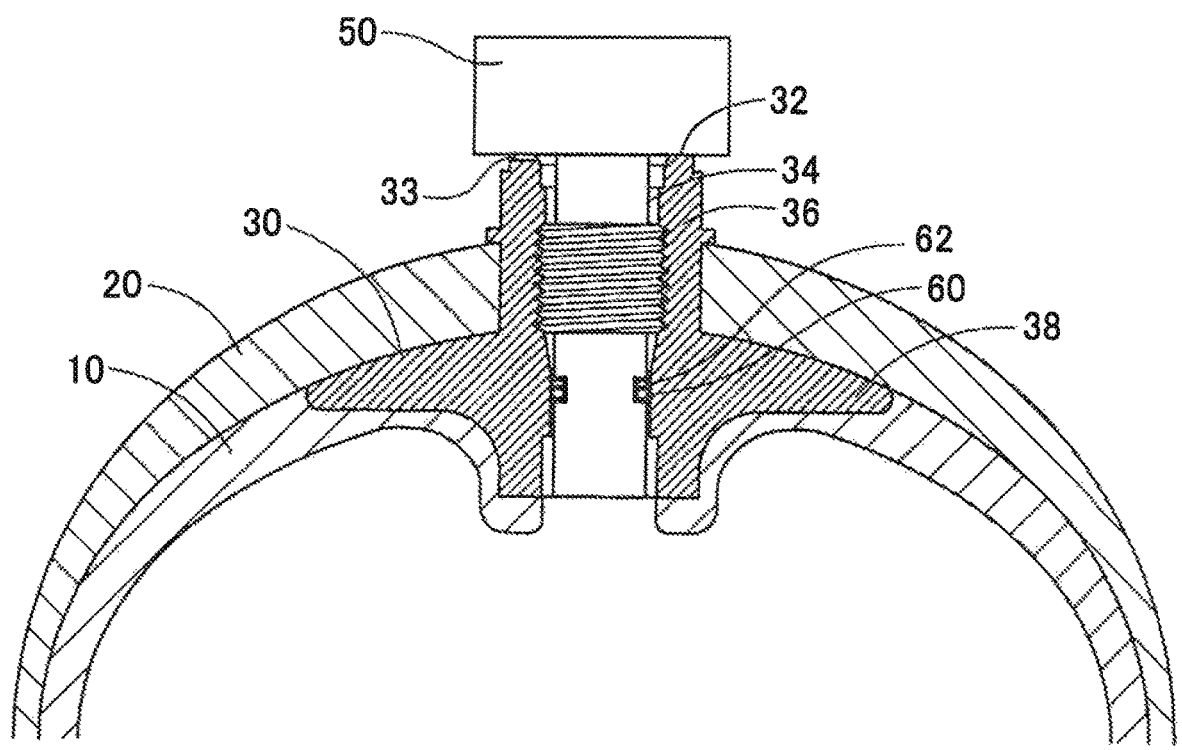
FIG. 2 is an explanatory view of a state of a connection section between a base and a valve.

B. Configuration of Connection Section Between Base and Valve: FIG. 2 is an explanatory view in which a state of the connection section between the base 30 and the valve 50 is enlarged. In FIG. 2, states of portions other than the valve 50 are shown in a cross section. As shown in FIG. 2, the valve 50 is formed with a male screw on an outer peripheral surface of a columnar portion that is inserted in the cylindrical section 36 of the base 30. In addition, a female screw is formed on an inner peripheral surface of the cylindrical section 36 of the base 30. When these male screw and female screw are tightened, the valve 50 is attached to the opening of the base 30.

When the valve 50 is attached to the opening of the base 30, a surface of an end of the base 30 that forms the opening of the base 30 comes in contact with the valve 50. The surface of the end of the base 30 that comes in contact with the valve 50 will hereinafter be referred to as a seat surface 32. When the valve 50 is attached to the base 30, just as described, a portion of the valve 50 other than the columnar portion, which is inserted in the cylindrical section 36, is arranged to cover the seat surface 32 of the base 30 and extend from an outer periphery of the seat surface 32. That is, a diameter of the portion of the valve 50 other than the columnar portion, which is inserted in the cylindrical section 36 of the base 30, is larger than a diameter of the outer periphery of the seat surface 32 of the base 30.

As shown in FIG. 2, an O-ring 60 is arranged between the outer peripheral surface of the columnar portion of the valve 50, which is inserted in the base 30, and the inner peripheral surface of the cylindrical section 36 of the base 30. Between the valve 50 and the base 30, the O-ring 60 is arranged at a position on the inner side of the high-pressure gas tank 100 from a position at which the male screw and the female screw, which have already been described, are tightened. Note that, between the valve 50 and the base 30, a backup ring 62 is further arranged at a position that is next to the O-ring 60 and that is on an outer side of the high-pressure gas tank 100 from the O-ring 60.

A space 34 as a minute space is formed at a position that is between the valve 50 and the inside of the cylindrical section 36 of the base 30 and that is on the outer side of the high-pressure gas tank 100 from the position at which the male screw and the female screw, which have already been described, are tightened. One end of this space 34 is closed when the male screw and the female screw described above are tightened and the seat surface 32 of the base 30 is tightly attached to the valve 50. That is, the seat surface 32 of the base 30 and a contact surface of the valve 50 that contacts the seat surface 32 are in contact with each other in an airtight manner, except for a portion formed with a slit 33, which will be described below.

When the space 34 is closed by the valve 50, just as described, a foreign substance is suppressed from entering the space 34 from the outside of the high-pressure gas tank 100. As the foreign substance that possibly enters the space 34, an acidic or alkaline solution is exemplified. When such a foreign substance enters the space 34, an inner surface of the base 30 and an outer surface of the valve 50 are possibly corroded in portions where the base 30 and the valve 50 are tightened, for example. As a result, a fastening force between the base 30 and the valve 50 is possibly decreased. In this embodiment, such inconvenience is suppressed by closing the space 34.

Figure 3:
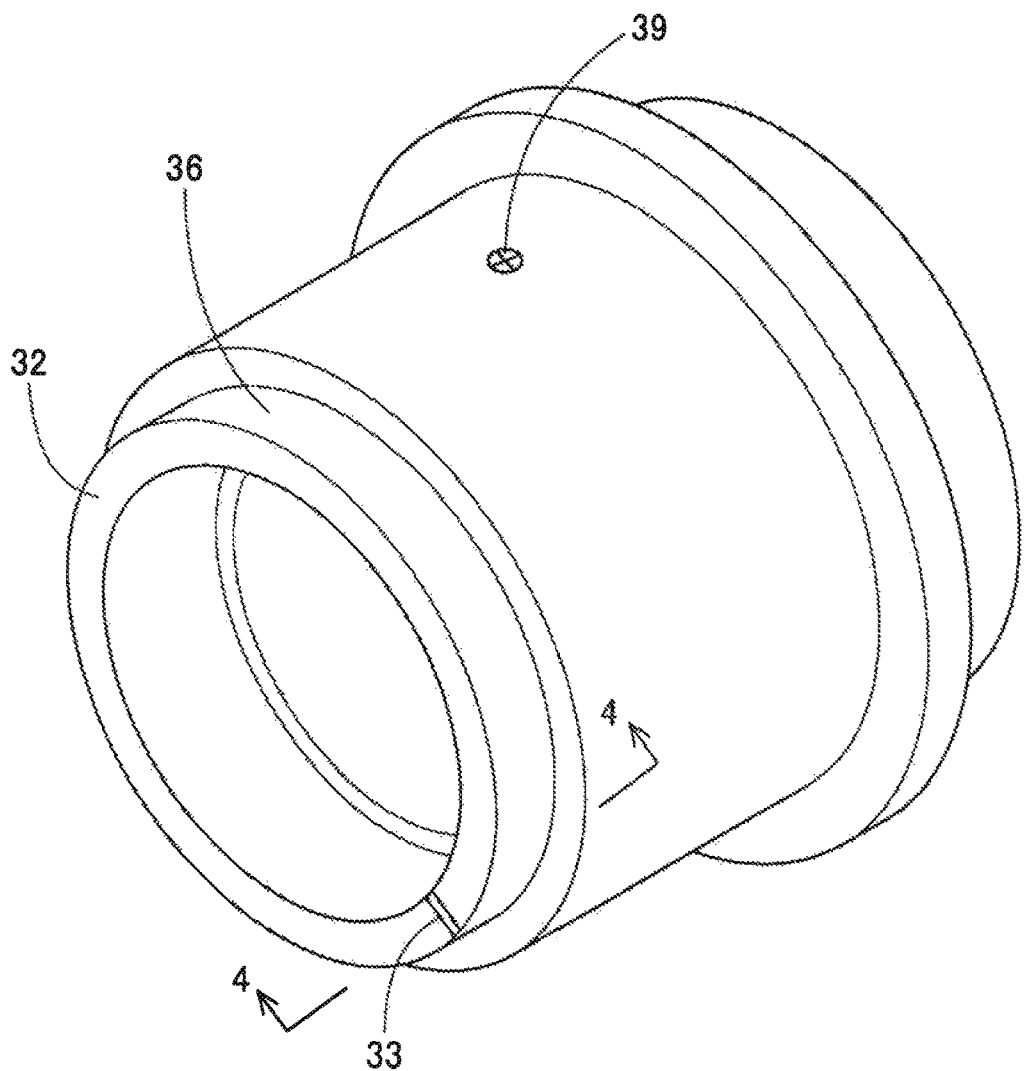
FIG. 3 is a perspective view of external appearance of a cylindrical section of the base.

FIG. 3 is a perspective view of a state where external appearance of the cylindrical section 36 of the base 30 is seen from a tip (the seat surface 32) side of the cylindrical section 36. As shown in FIG. 3, the slit 33 is provided on the seat surface 32 of the base 30. The slit 33 has a groove structure and is provided to continuously and linearly extend from an inner periphery to the outer periphery of the seat surface 32. The slit 33 has the structure of forming a communication hole that communicates between the outside of the high-pressure gas tank 100 and a space between an inner peripheral surface of the base 30 and an outer peripheral surface of the valve 50. Here, the outside of the high-pressure gas tank 100 does not simply indicate the outside of the liner 10 (the tank body section) but indicates the outside of the entire high-pressure gas tank 100, which includes the base 30 and the valve 50 in addition to the liner 10 and the reinforcing layer 20. The communication hole, which is formed by the slit 33 between the seat surface 32 of the base 30 and the valve 50, will hereinafter also be referred to as a slit communication hole. Note that the slit 33 can be formed by a method for processing a groove by using an end mill with a minute tip, a method for processing the groove by using a laser or an electron beam, or the like, for example.

Figure 4:
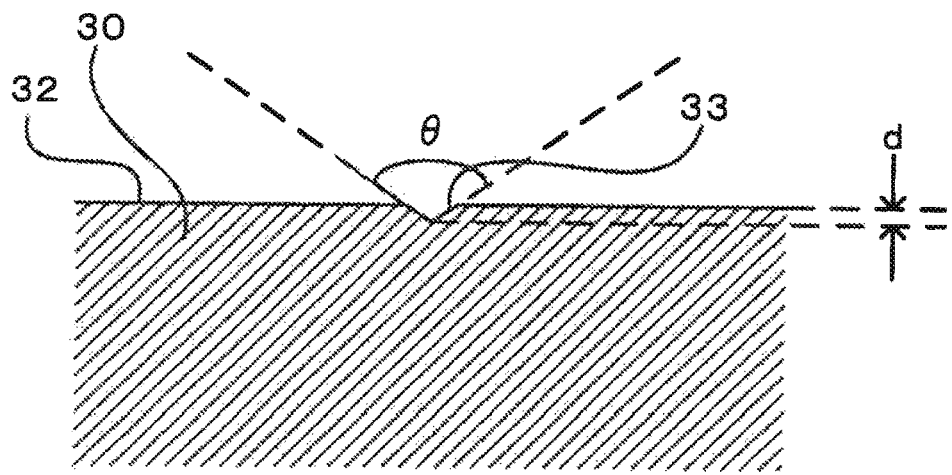
FIG. 4 is a cross-sectional view of a state of a slit.

FIG. 4 is a cross-sectional view of a state of the slit 33 in a cross section that is perpendicular to an extending direction of the slit 33. A position of the cross section shown in FIG. 4 is shown as a 4-4 cross section in FIG. 3. As shown in FIG. 4, the slit 33 is formed to have a triangular (wedge-shaped) cross section. In such a slit 33, an angle (an angle θ shown in FIG. 4) of a vertex of the triangle is preferably set from 30° to 120°, for example. In addition, a depth (height of the triangle) d of the slit 33 is preferably set from 0.05 mm to 0.3 mm, for example.

In FIG. 4, the cross section of the slit 33 has a triangular shape; however, the cross section of the slit 33 may have another shape such as a semicircular shape. In such a case, a radius of the above semicircular shape is preferably set from 0.05 mm to 0.3 mm, for example.

Just as described, the depth d of the slit 33 is preferably set from 0.05 mm to 0.3 mm, for example. In addition, width of an opening of the slit 33 in the seat surface 32 is preferably 0.05 mm or greater and is further preferably 0.1 mm or greater. The width of the opening of the slit 33 in the seat surface 32 is preferably 0.6 mm or less. Here, in the case where the slit 33 is excessively large, the entry of the foreign substance via the slit 33 is facilitated. When the foreign substance enters the space 34, as it has already been described, the surfaces of the base 30 and the valve 50 are possibly corroded on the inside of the base 30, or the slit communication hole is possibly closed by the entered foreign substance. In addition, in the case where a liquid such as water enters the space 34, the slit communication hole is possibly closed when the liquid is frozen under a low-temperature condition. In the case where the slit 33 is excessively small, an effect realized by provision of the slit communication hole possibly becomes insufficient. Thus, in consideration of a risk of the entry of the foreign substance and the effect realized by the provision of the slit communication hole, the slit 33 is desirably provided to have size that falls within the above range.

As shown in FIG. 3, on an outer peripheral surface of the cylindrical section 36 of the base 30, a positioning mark 39 is provided at a position that can be visually recognized from the outside of the high-pressure gas tank 100. This positioning mark 39 serves as a mark that is used to identify a direction of the high-pressure gas tank 100 when the high-pressure gas tank 100 is installed. More specifically, when the high-pressure gas tank 100 is arranged such that the axis O of the high-pressure gas tank 100 becomes parallel with a horizontal direction, the positioning mark 39 is used as the mark with which an arrangement position of the slit 33 is located near the lowest point in a vertical direction. In this embodiment, the positioning mark 39 is provided such that the slit 33 is placed at a desired position when the high-pressure gas tank 100 is arranged such that the positioning mark 39 is positioned at the highest point in the vertical direction.

The positioning mark 39 may be formed by engraving the mark in a particular shape on the outer peripheral surface of the cylindrical section 36, for example. Alternatively, in addition to being engraved on the outer peripheral surface of the cylindrical section 36 as described above, the positioning mark 39 may be provided by partially changing an outer shape of the base 30 (for example, providing a flat section in a particular portion of an outer peripheral surface of the base 30 or providing a notch in the particular portion of the outer peripheral surface of the base 30). The positioning mark 39 only has to be visually recognizable from the outside of the high-pressure gas tank 100 when the high-pressure gas tank 100 is installed.

Figure 5:
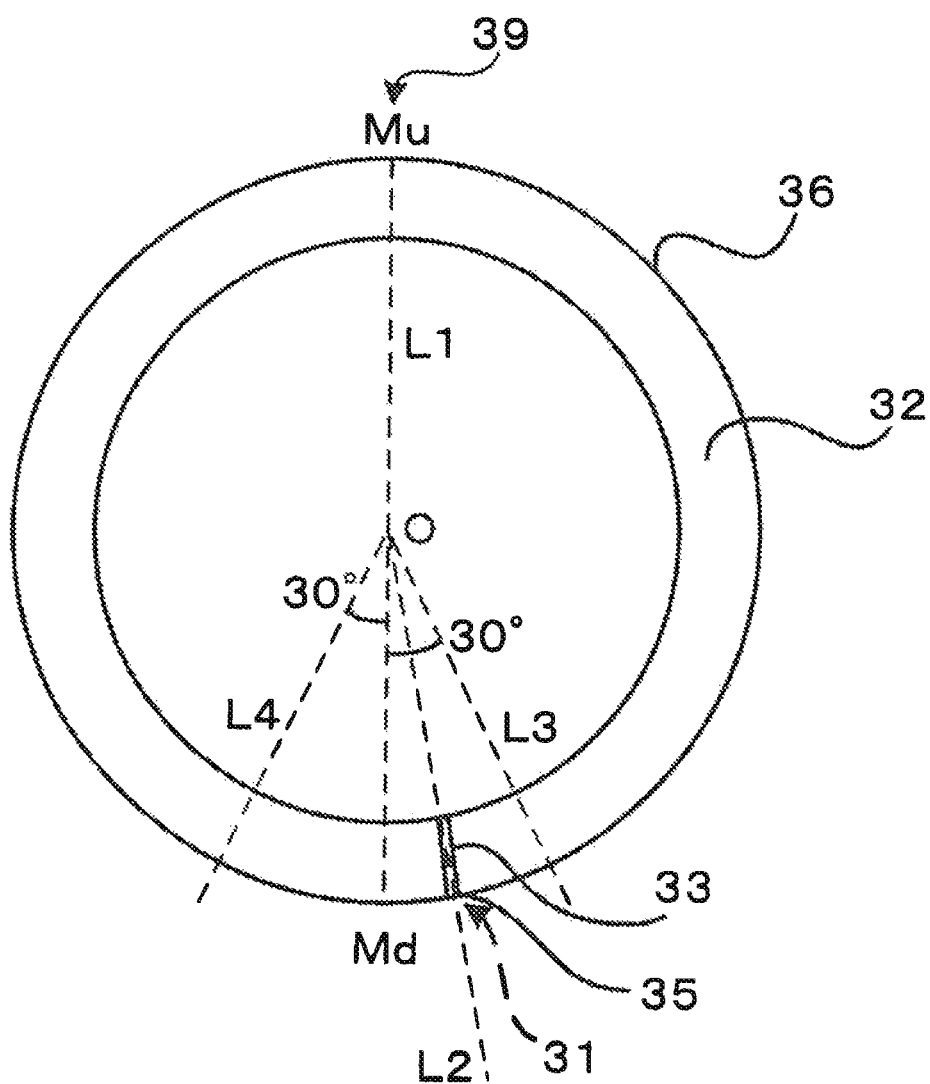
FIG. 5 is an explanatory view of a state where the cylindrical section is seen from a seat surface side.

FIG. 5 is an explanatory view of a state where the cylindrical section 36 of the base 30 is seen from the seat surface 32 side when the high-pressure gas tank 100 is arranged such that the axis O of the high-pressure gas tank 100 becomes parallel with the horizontal direction. In FIG. 5, the high-pressure gas tank 100 is arranged such that the positioning mark 39 is positioned at the highest point in the vertical direction. In FIG. 5, a straight line that connects the highest point Mu in the vertical direction on the outer periphery of the seat surface 32 and the axis O is shown as a straight line L1. In addition, a straight line that connects an end 35 on the outer peripheral side of the slit 33 in the seat surface 32 and the axis O is shown as a straight line L2. In this embodiment, in the seat surface 32, the end 35 exists below the axis O in the vertical direction, and an acute angle defined by the straight line L1 and the straight line L2 is 30° or less. In FIG. 5, two straight lines, each of which passes the axis O, which hold the lowest point Md in the vertical direction in the seat surface 32 therebetween, and each of which defines an angle of 30° from the straight line L1, are respectively shown as L3, L4. The straight line L2 only has to pass a region that is held between the straight lines L3, LA and that includes the lowest point Md. The straight line L1 functions as the "third straight line", and the straight line L2 functions as the "fourth straight line". Note that the above end 35 on the outer peripheral side of the seat surface 32 forms an opening of the slit communication hole that is formed on the outer peripheral surface of the base 30. In the following description, such an opening of the slit communication hole will be referred to as an opening 31 (see FIG. 6, which will be described below).

It can also be said that, in the state shown in FIG. 5, when a first straight line that extends from the positioning mark 39 toward the axis O of the high-pressure gas tank 100 in a perpendicular direction to the axis O and a second straight line that extends from the opening 31 of the slit communication hole formed on the outer peripheral surface side of the base 30 toward the axis O in the perpendicular direction to the axis O are seen in the axis-O direction, an acute angle defined by the first straight line and the second straight line is 30° or less. The above first straight line corresponds to the straight line L1, and the above second straight line corresponds to the straight line L2.

Figure 6:
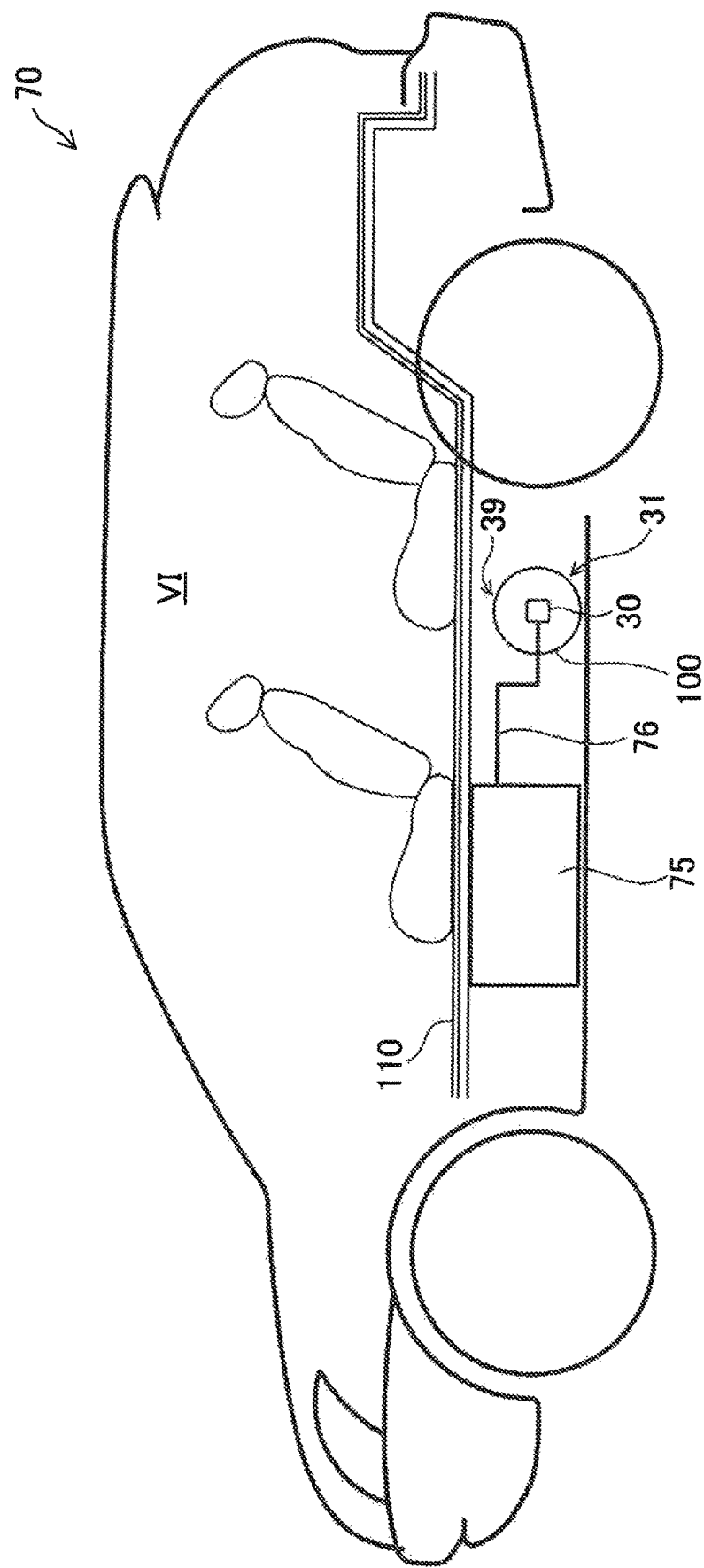
FIG. 6 is an explanatory view of a schematic configuration of a fuel cell vehicle on which the high-pressure gas tank is mounted.

C. Mounting of High-Pressure Gas Tank On Movable Body: FIG. 6 is an explanatory view of a schematic configuration of a vehicle 70 as the fuel cell vehicle, on which the high-pressure gas tank 100 of the embodiment of the disclosure is mounted. On the vehicle 70, the high-pressure gas tank 100, which stores compressed hydrogen, is mounted as a fuel tank that stores drive fuel. In addition, a fuel cell 75 generates electricity by using hydrogen in the high-pressure gas tank 100, and the electricity is supplied to a motor, which is not shown, so as to obtain drive power of the vehicle 70. Note that, in a fuel cell system including the fuel cell 75, portions other than a portion related to the supply of hydrogen to the fuel cell 75 will not be shown or described.

On the vehicle 70, the fuel cell 75 is mounted below a floor panel 110 that constitutes a floor of a vehicle cabin VI. A hydrogen supply channel 76 is provided between the fuel cell 75 and the high-pressure gas tank 100, and connects a hydrogen channel on the inside of the fuel cell 75 and the valve 50 of the high-pressure gas tank 100. Here, the vehicle cabin VI functions as the "cabin portion".

In the vehicle 70, the high-pressure gas tank 100 is arranged such that the axis O of the high-pressure gas tank 100 becomes parallel with the horizontal direction. In addition, the high-pressure gas tank 100 is arranged such that the positioning mark 39, which is provided on the outer peripheral surface of the base 30, is positioned at the highest point in the vertical direction. Because the positioning mark 39 and the slit 33 (the opening 31 of the slit communication hole formed on the outer peripheral surface side of the base 30) have a positional relationship shown in FIG. 5, the opening 31 of the slit communication hole in the base 30 is positioned near the lowest point in the vertical direction. Note that the number of the high-pressure gas tank 100 mounted on the vehicle 70 is not limited to one but can be the arbitrary plural number. Also, in this case, in each of the high-pressure gas tanks 100, the positioning mark 39 and the opening 31 of the slit communication hole (the end 35 on the outer peripheral side of the slit 33) in the base 30 are preferably arranged as shown in FIG. 5 and FIG. 6.

In the high-pressure gas tank 100 of this embodiment that is configured as described so far, the slit 33 that forms the slit communication hole for communicating between the outside of the high-pressure gas tank 100 and the space between the base 30 and the valve 50 is provided on the seat surface 32 of the base 30. Thus, a pressure increase in the space 34 (see FIG. 2), which is formed in the base 30, and the space continued therefrom can be suppressed. That is, even when hydrogen on the inside of the high-pressure gas tank 100 is leaked to the space 34 side via the O-ring 60, leaked hydrogen can be discharged to the outside of the high-pressure gas tank 100 via the slit communication hole. As a result, the pressure in the space 34 is suppressed from exceeding an internal pressure (hereinafter also referred to as an "in-tank pressure") of the liner 10 (hereinafter also referred to as a pressure reverse phenomenon). Thus, degradation of a sealing property of the O-ring 60, which is caused by the pressure reverse phenomenon, can be suppressed.

Figure 7:
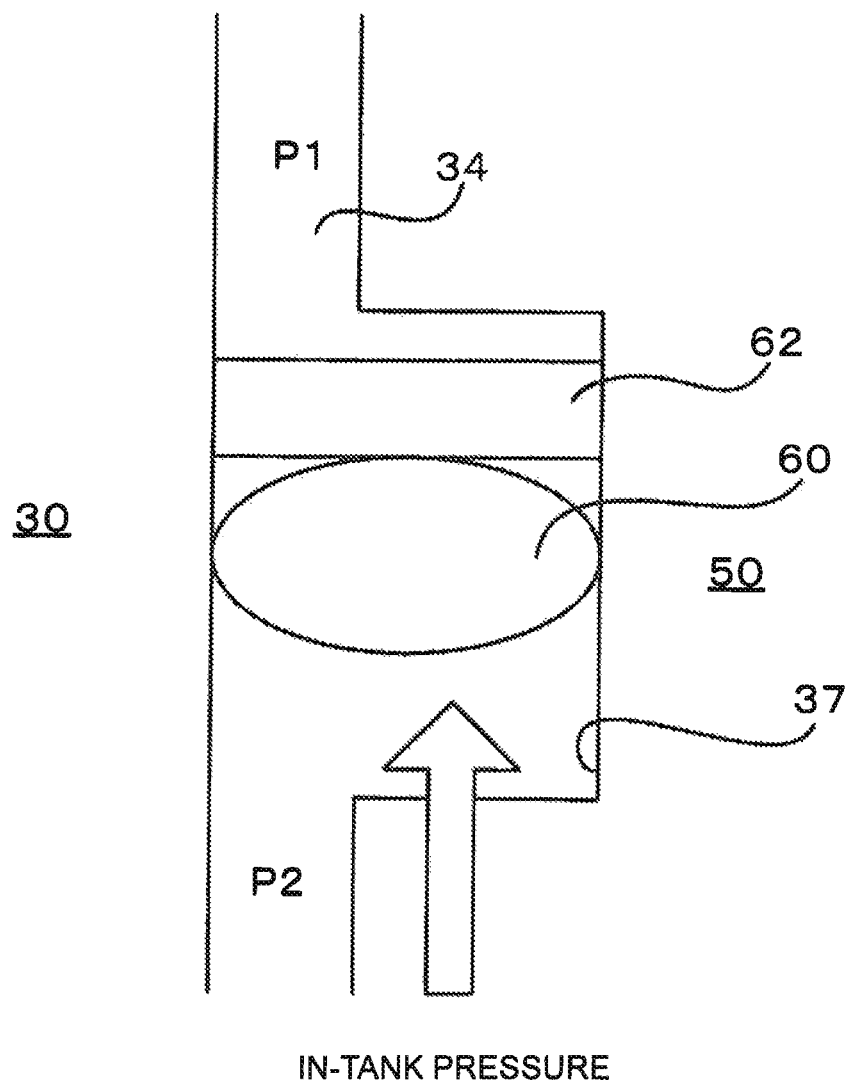
FIG. 7 is an explanatory view in which a state of vicinity of an arrangement position of an O-ring is enlarged.

FIG. 7 is an explanatory view in which a state of the vicinity of an arrangement position of the O-ring 60 is enlarged. In FIG. 7, the pressure in the space 34 and the in-tank pressure are respectively indicated as P1 and P2. The O-ring 60 of this embodiment is produced to exert the sufficient sealing property in the cases where the in-tank pressure P2 is higher than the pressure P1 in the space 34 and the O-ring 60 is squished to the backup ring 62 side by the in-tank pressure P2. That is, the backup ring 62 has a function of supporting the O-ring 60, which is squished by receiving the in-tank pressure P2, and suppressing separation of the O-ring 60 from a ring groove 37 in which the O-ring 60 is arranged.

On the other hand, in the cases where hydrogen is leaked to the space 34 side via the O-ring 60 and the pressure P1 in the space 34 is increased to be higher than the in-tank pressure P2, the O-ring 60 is squished (deformed) to a side where the O-ring 60 is not supported by the backup ring 62. Thus, the O-ring 60 is possibly separated from the ring groove 37. As a result, the sealing property of the O-ring 60 is degraded. Once such degradation of the sealing property, which is caused by the undesired deformation of the O-ring 60, occurs, the sealing property is normally less likely to be recovered thereafter even in the case where the pressure reverse phenomenon is eliminated by filling the high-pressure gas tank 100 with hydrogen, or the like. In this embodiment, by providing the slit 33 on the seat surface 32, hydrogen that is leaked via the O-ring 60 is discharged without being accumulated in the space 34, and occurrence of the pressure reverse phenomenon can thereby be suppressed.

Note that, differing from FIG. 7, a configuration of arranging another backup ring at a position that is next to the O-ring 60 and is on a different side from the backup ring 62 (the inner side of the high-pressure gas tank 100) is also considered. With such a configuration, an effect of suppressing the degradation of the sealing property of the O-ring 60, which is caused by the pressure reverse phenomenon, can be expected by the above other backup ring. However, when such a configuration is adopted, the O-ring 60 is pressed to the backup ring 62 side by the above other backup ring in a normal state of P1<P2. There is a difficulty in processing of the above backup ring in a shape capable of pressing the O-ring 60 such that the desired sealing property is obtained at this time. In this case, the number of components of the relatively expensive backup ring is increased, which leads to a cost increase. According to this embodiment, the slit 33 is formed by the processing that can easily be performed at low cost, such as groove processing, while an increase in the number of the components is suppressed. In this way, the undesired pressure increase in the base 30 can be suppressed with high reliability. Note that, when the increase in the number of the components and the like are acceptable, the above other backup ring can further be used in this embodiment.

As a method for suppressing an increase in the pressure P1 in the space 34, the following method is also considered: at least one of the seat surface 32 and the contact surface of the valve 50 that is in contact with the seat surface 32 is roughed, for example, and an amount of hydrogen that corresponds to an amount of hydrogen leaked via the O-ring 60 can thereby be discharged via the entire seat surface 32. However, when a degree of surface roughness of the above roughed surface is excessively increased, a problem of the entry of the foreign substance into the base 30 via a gap between the seat surface 32 and the valve 50 possibly occurs. Meanwhile, in the case where the above surface is roughed in a sufficiently fine manner so as to prevent the entry of the foreign substance, there is a technical difficulty in uniform surface roughing that can realize desired gas flowability. According to this embodiment, the slit 33 is formed by the groove processing, which is far easier and less expensive than surface roughing, or the like. Thus, the undesired pressure increase in the base 30 can be suppressed with the high reliability.

In addition, according to the high-pressure gas tank 100 of this embodiment, as shown in FIG. 2, the valve 50 is arranged to cover the entire seat surface 32 of the base 30 and extend from the outer periphery of the seat surface 32. Accordingly, the opening 31 of the slit communication hole is covered with the valve 50, and the entry of the foreign substance into the slit communication hole is thereby suppressed. Note that the valve 50 does not always have to extend from the entire outer periphery of the seat surface 32; however, on the outer periphery of the seat surface 32, the valve 50 desirably extends at least in a region that overlaps the opening 31 of the slit communication hole.

Note that, as a method for forming a communication passage that communicates between the space 34 in the base 30 and the outside of the high-pressure gas tank 100, a method for forming a communication hole that penetrates the base 30 is considered. However, processing for forming such a through hole is difficult. In addition, unlike this embodiment, an opening on an outer surface side of the communication hole that penetrates the base 30 is not covered with the valve 50 and is exposed to the outside of the high-pressure gas tank 100. Thus, a possibility of the entry of the foreign substance is increased. According to this embodiment, the slit 33 is formed on the seat surface 32 by the groove processing, which is far easier and less expensive than formation of the through hole, or the like. Thus, the undesired pressure increase in the base 30 can be suppressed with the high reliability while the entry of the foreign substance is suppressed.

Furthermore, in the high-pressure gas tank 100 of this embodiment, the positioning mark 39 and the slit 33 satisfy the positional relationship shown in FIG. 5. More specifically, when the positioning mark 39 is positioned at the highest point in the vertical direction, in the seat surface 32, the acute angle defined by the straight line L1, which connects the highest point Mu in the vertical direction and the axis O, and the straight line L2, which connects the end 35 on the outer peripheral side of the slit 33 and the axis O, is 30° or less. Then, in the vehicle 70, the high-pressure gas tank 100 is arranged such that the positioning mark 39 is positioned at the highest point in the vertical direction. Thus, a long distance can be secured between the opening 31 of the slit communication hole and the vehicle cabin VI. In the case where hydrogen is discharged to the outside of the high-pressure gas tank 100 via the opening 31 of the slit communication hole, hydrogen can easily be diffused before reaching the vehicle cabin VI. Accordingly, entry of hydrogen, which is discharged from the opening 31, into the vehicle cabin VI through a gap of the floor panel 110 or the like can be suppressed. Note that, from a perspective of suppressing the entry of hydrogen into the vehicle cabin VI, the acute angle defined by the straight line L1 and the straight line L2 is preferably as small as possible, and overlapping of the straight line L1 and the straight line L2 (positioning of the end 35 at the lowest point) is the most desirable.

In the embodiment, the positioning mark 39 is provided at the position at which the positioning mark 39 can be visually recognized from the outside of the high-pressure gas tank 100, and the slit 33 is positioned by arranging the high-pressure gas tank 100 such that the positioning mark 39 is positioned at the highest point in the vertical direction. However, a different configuration may be adopted therefor. For example, the high-pressure gas tank 100 may be positioned by a method other than that using the positioning mark 39 provided on the base 30. As it has been described on the basis of FIG. 5, when the high-pressure gas tank 100 is arranged such that the end 35 of the slit 33 is positioned near the lowest point in the vertical direction, a similar effect to that of the embodiment is obtained.

D: Modified Examples:•First modified example (modification of the slit): in the above embodiment, the opening 31 of the slit communication hole exists below the axis O in the vertical direction when the positioning mark 39 is arranged at the highest point in the vertical direction. However, a different configuration may be adopted therefor. For example, when the positioning mark 39 is arranged at the lowest point in the vertical direction, the opening 31 of the slit communication hole may exist below the axis O in the vertical direction. Also, in such a case, when the first straight line (corresponding to the straight line L1) that extends from the positioning mark 39 toward the axis O of the high-pressure gas tank 100 in the perpendicular direction to the axis O and the second straight line (corresponding to the straight line L2) that extends from the opening 31 of the slit communication hole formed on the outer peripheral surface side of the base 30 toward the axis O in the perpendicular direction to the axis O are seen in the axis-O direction, the acute angle defined by the first straight line and the second straight line only has to be 30° or less. In such a case, when the high-pressure gas tank 100 is arranged such that the positioning mark 39 is positioned at the lowest point in the vertical direction, the similar effect to that of the embodiment is obtained.

In the above embodiment, the slit 33 is formed linearly to connect the inner periphery and the outer periphery of the seat surface 32. However, a different configuration may be adopted therefor. For example, the slit 33 may have a curved section or the like in the middle. However, from a perspective of decreasing pressure loss of the slit communication hole, the slit 33 is desirably formed linearly.

In the above embodiment, the only one slit 33 is provided. However, a plurality thereof may be provided. In the case where the plural slits are provided, hydrogen can be discharged from the inside of the base 30 by another slit(s) even when one of the slits is closed. Thus, reliability of the sealing property by the O-ring 60 can be improved. Meanwhile, when the number of the slits is increased, an area of a contact portion between the seat surface 32 and the valve 50 is decreased. Thus, there is a possibility that, when the valve 50 is assembled to the base 30, the base 30 is more likely to be deformed, or the assembled valve 50 and the base 30 are more likely to be loosened, or the like. In addition, when the number of the slits is increased, processing cost is increased. The number of the slits may appropriately be set in consideration of the above influences of an increase in the number of the slits. Note that, even when the plural slits are provided, positions of these slits are desirably located near the lowest point in the vertical direction, that is, satisfy the positional relationship that has been described on the basis of FIG. 5.

In the above embodiment, the slit 33 is provided on the seat surface 32 of the base 30. However, a different configuration may be adopted therefor. Instead of the seat surface 32, or in addition to the seat surface 32, the slit may be provided on the contact surface of the valve 50 with the seat surface 32. The slit that forms a communication hole communicating between the space 34 in the base 30 and the outside of the high-pressure gas tank 100 only has to be provided on at least one of the seat surface 32 and the contact surface of the valve 50 with the seat surface 32.

Second modified example: in the above embodiment, the seat surface 32 of the base 30 and the contact surface of the valve 50 are formed perpendicularly to the axis O of the high-pressure gas tank 100. However, a different configuration may be adopted therefor. Even when the above seat surface 32 and the above contact surface are not perpendicular to the axis O, in a cross section of the high-pressure gas tank 100 that includes the opening 31 of the slit communication hole and is perpendicular to the axis O, an acute angle defined by a straight line (corresponding to the straight line L1), which connects the highest point (corresponding to Mu in FIG. 5) in the vertical direction on an outer periphery of this cross section and the axis O, and a straight line (corresponding to the straight line L2), which connects the opening 31 of the slit communication hole and the axis O, only has to be 30° or less.

Third modified example: in the above embodiment, the high-pressure gas tank 100 is arranged such that the axis O of the high-pressure gas tank 100 becomes parallel with the horizontal direction, and the slit 33 is formed such that the opening 31 of the slit communication hole is positioned near the lowest point in the vertical direction at this time. However, a different configuration may be adopted therefor. Even when different arrangement is adopted, the increase in the pressure P1 in the space 34 is suppressed by providing a slit. In this way, a similar effect of suppressing the degradation of the sealing property of the O-ring 60 is obtained.

Fourth modified example: in the above embodiment, the O-ring 60 is used as a seal member that seals the gap between the inner peripheral surface of the base 30 and the outer peripheral surface of the valve 50. However, a different configuration may be adopted therefor. For example, any of various types of gaskets in shapes other than the O-ring can be used.

Fifth modified example: in the above embodiment, the high-pressure gas tank 100 stores compressed hydrogen. However, a different configuration may be adopted therefor. In a high-pressure gas tank that stores high-pressure gas other than hydrogen, the similar effect is obtained by applying the disclosure of the present application.

Sixth modified example: in the above embodiment, the high-pressure gas tank 100 is mounted on the vehicle 70 that includes the fuel cell 75. However, a different configuration may be adopted therefor. For example, when the disclosure of the present application is applied to a fuel tank that is mounted on a movable body other than the fuel cell vehicle and stores the gas as the drive fuel, the similar effect is obtained. In addition, the disclosure of the present application may be applied to a high-pressure gas tank that stores gas to be used in a device other than the movable body, and the similar effect is obtained. At this time, furthermore, when the high-pressure gas tank is arranged such that the opening of the slit communication hole is positioned near the lowest point in the vertical direction as it has been described on the basis of FIG. 5, a distance is secured from the opening of the slit communication hole to a space above an installation position of the high-pressure gas tank. In this way, an influence of the gas leaked from the slit on the above space can be suppressed.

The disclosure is not limited to the embodiment and the modified examples described above but can be realized by various configurations within the scope that does not depart from the gist thereof. For example, technical features in the embodiment and the modified examples that correspond to technical features in aspects described in SUMMARY can appropriately be replaced or combined. In addition, unless any of those technical features is described to be essential in this specification, such a technical feature(s) can appropriately be omitted.

What is claimed is:

1. A high-pressure gas tank comprising:
  a tank body section formed with a space for storing gas in the space;
  a base attached to an opening of the tank body section;
  a valve attached to an opening of the base so as to open and close the opening of the base, a part of the valve being inserted in the base from the opening of the base, and the valve having a contact surface that contacts a seat surface as a surface of an end of the base, the surface of the end of the base forming the opening of the base; and a seal member arranged between an outer peripheral surface of a portion of the valve that is inserted in the opening of the base and an inner peripheral surface of the base, wherein a slit that forms a communication hole communicating between outside of the high-pressure gas tank and a space between the base and the valve is provided on at least one of the seat surface of the base or the contact surface of the valve, and the slit has a depth in a range of from 0.05 mm to 0.3 mm.

2. The high-pressure gas tank according to claim 1, wherein the valve is arranged in a manner to cover the seat surface of the base and extend from an outer periphery of the seat surface.

3. The high-pressure gas tank according to claim 2, wherein a diameter of a portion of the valve other than a columnar portion that is inserted in a cylindrical section of the base is larger than a diameter of the outer periphery of the seat surface of the base.

4. The high-pressure gas tank according to claim 1, wherein the base has a positioning mark, which can be visually recognized from the outside of the high-pressure gas tank, on an outer peripheral surface of the base, and when a first straight line that extends from the positioning mark toward an axis of the high-pressure gas tank in a perpendicular direction to the axis and a second straight line that extends from an opening of the communication hole formed on an outer peripheral surface side of the base toward the axis in the perpendicular direction to the axis are seen in an extending direction of the axis, an acute angle defined by the first straight line and the second straight line is 30° or less.

5. The high-pressure gas tank according to claim 1, wherein the slit is provided on the seat surface of the base.

6. The high-pressure gas tank according to claim 1, wherein the valve is formed with a male screw on an outer peripheral surface of a columnar portion that is inserted in a cylindrical section of the base, and the base is formed with a female screw on an inner peripheral surface of the cylindrical section, between the valve and the base, the seal member is arranged at a position on an inner side of the high-pressure gas tank from a position at which the male screw and the female screw are tightened, and between the valve and the base, a backup ring is arranged at a position that is next to the seal member and that is on an outer side of the high-pressure gas tank from the seal member.

7. A movable body comprising:

the high-pressure gas tank according to claim 1, wherein the high-pressure gas tank is mounted as a fuel tank that stores drive fuel, the high-pressure gas tank is arranged at a position below a cabin portion in the movable body such that an axis of the high-pressure gas tank becomes parallel with a horizontal direction, and in a cross section of the high-pressure gas tank that includes an opening of the communication hole formed on an outer peripheral surface side of the base and that is perpendicular to the axis, the opening of the communication hole exists below the axis in a vertical direction, and an acute angle defined by a third straight line that connects a highest point on an outer periphery of the cross section in the vertical direction and the axis and a fourth straight line that connects the opening of the communication hole and the axis is 30° or less.

* * * * *